July 18, 1939.                 C. DERLETH                    2,166,753
                                CHEESE VAT
                          Filed Oct. 21, 1938              2 Sheets-Sheet 1

July 18, 1939.  C. DERLETH  2,166,753

CHEESE VAT

Filed Oct. 21, 1938  2 Sheets-Sheet 2

Inventor
Clark Derleth
By Zabel Carlson Gritzbaugh & Wells Attys

Patented July 18, 1939

2,166,753

UNITED STATES PATENT OFFICE 2,166,753

CHEESE VAT

Clark Derleth, Watertown, Wis., assignor to Kusel Dairy Equipment Co., Watertown, Wis., a corporation of Wisconsin Application October 21, 1938, Serial No. 236,145

7 Claims. (Cl. 257—208)

The present invention relates to vats which are used in the manufacture of cheese.

In the manufacture of cheese it is necessary to heat the milk, and in the manufacture of cottage cheese in particular the quality of the product can be greatly improved by the manner in which it is heated. The skilled cheese maker is capable of judging whether or not the cheese has been heated sufficiently and at the proper rate. However, it is difficult with the equipment now available for the cheese manufacturer to control the heating so as to maintain the proper rate and gain the desired temperature.

It is the purpose of the present invention to provide a novel cheese vat and heating system with which it is possible for the cheese maker to accurately control the heating of the cheese.

It is also a purpose of this invention to provide a novel cheese vat construction which increases the uniformity of heating of the cheese throughout the entire vat. More particularly, it is a purpose of the present invention to provide a cheese vat and heating system wherein heated water is used as the medium for heating the cheese, and this water is circulated by a pump, heated by steam, and caused to flow uniformly around the milk or cheese container so as to heat all parts of the container at a uniform rate.

It is also a purpose of the present invention to provide a cheese vat of the character described which is so constructed as to increase the yield, as well as the quality of the cheese by properly shaping the cheese or milk container and by properly jacketing the milk container so that within certain limits the level to which the heating effect is applied can be varied to take care of a full vat or a partially filled vat of milk.

The features and advantages of the present invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings,

Fig. 4 is an enlarged sectional view showing the steam inlet nozzle that is used for heating the water.

Figure 1:
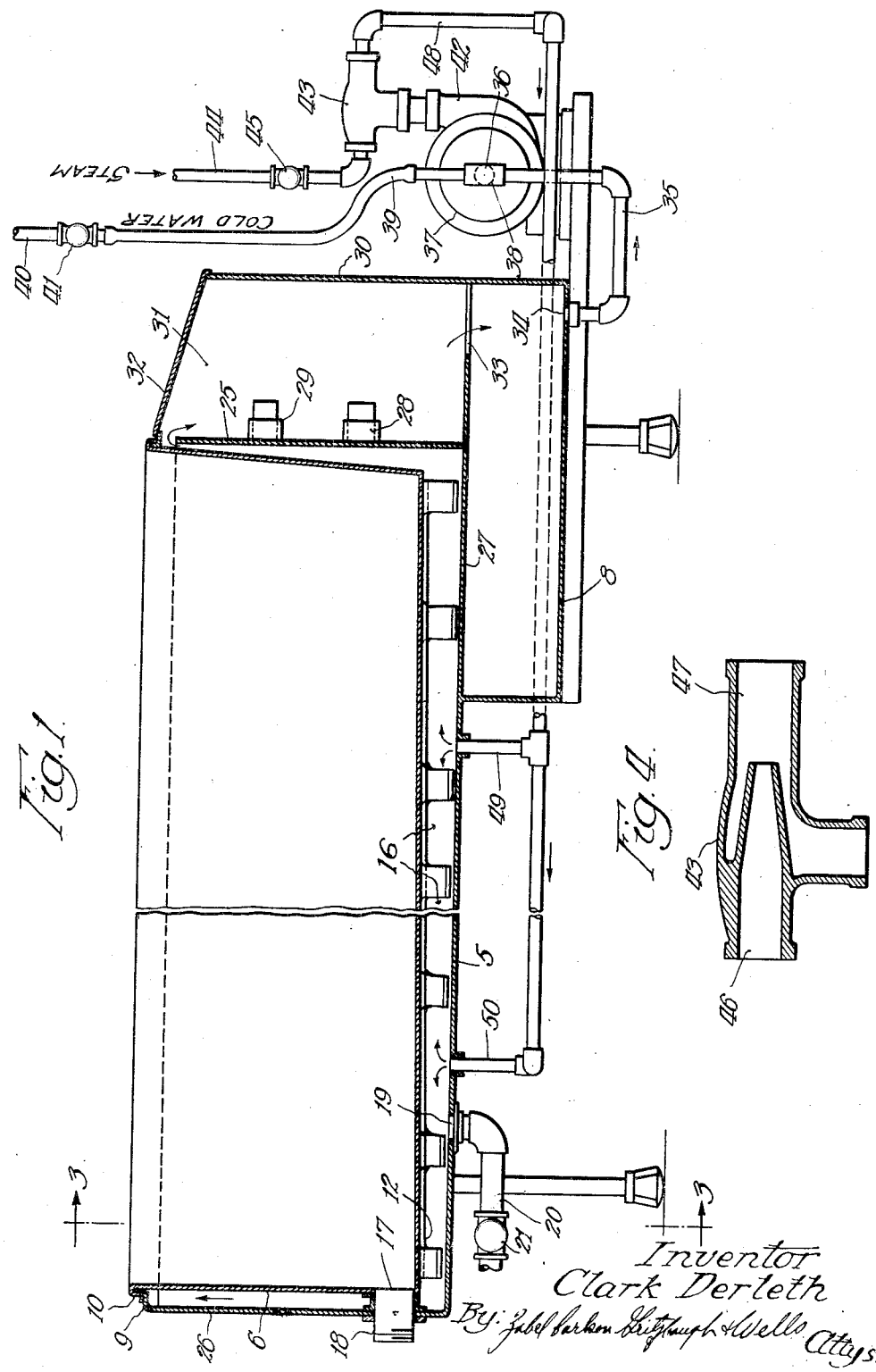
Fig. 1 is a longitudinal sectional view taken through a cheese vat embodying my invention.

Referring now to the drawings, the present invention is embodied in a cheese vat which comprises an outer vessel 5 constructed of sheet metal, an inner vessel 6, which is adapted to hold the milk or cheese and which is constructed of a suitable corrosion resistant material for this purpose. Between the inner vessel 6 and the outer vessel 5 there is a vertical partition 7. Beneath the outer vessel 5 and in communication therewith is a reservoir 8, the capacity of which is arranged to be in excess of the capacity necessary to surround the inner vessel with water.

The outer vessel has a top flange 9 upon which an out-turned flange 10 of the inner vessel rests. In addition, the inner vessel is supported by the outer vessel along the bottom thereof by means of longitudinally running strips 11, 12, 13 and 14. The strips are of sheet metal and are bent into substantially inverted U-shape. They are provided with apertures, indicated at 15 and 16, so as to permit ready flow of water from the center of the space beneath the inner vessel outwardly. The inner vessel has an outlet 17 from which a conduit 18 extends through the outer vessel 5 so that the whey can be drawn off in the usual fashion. The outer vessel has a bottom outlet at 19 connected to a valved discharge pipe 20. The pipe 20 may lead to a sewer or other place of disposal for the water. A valve 21 is shown in the pipe 20.

The inner vessel 6 and the partition 7 are held in proper spaced relation with respect to each other by a plurality of spacers 22. The partition 7 comprises two side walls 23 and 24 and an inner wall 25. The side walls 23 and 24 butt directly against one end 26 of the outer vessel 5 and are sealed thereto, for example, by welding. The partition walls 23, 24 and 25 are also welded to the bottom 27 of the outer vessel 5.

There are two outlets 28 and 29 at different levels in the end wall 25 of the partition. The top edge of the partition 7 provides a top limit to which the water may rise around the inner vessel 6. When the inner vessel is only partly filled with milk or cheese, then either outlet 28 or 29 may be utilized, depending upon the level of liquid in the inner vessel, to limit the water level around the inner vessel to about the same height as the level of the liquid in the inner vessel.

The partition wall 25 is spaced from the corresponding end 30 of the outer vessel 5 a substantial distance, to provide a well into which the water overflowing the partition 7 is delivered on its way to the reservoir 8. This well is indicated by the numeral 31. It is usually covered by a cover 32. The well 31 is connected with the reservoir 8 by an opening 33, so that water overflowing into the well will immediately flow into the reservoir 8. In the original filling of the vat with water, the cover 32 may be removed and the water can be directed into the well 31 from any suitable supply source.

Figure 2:
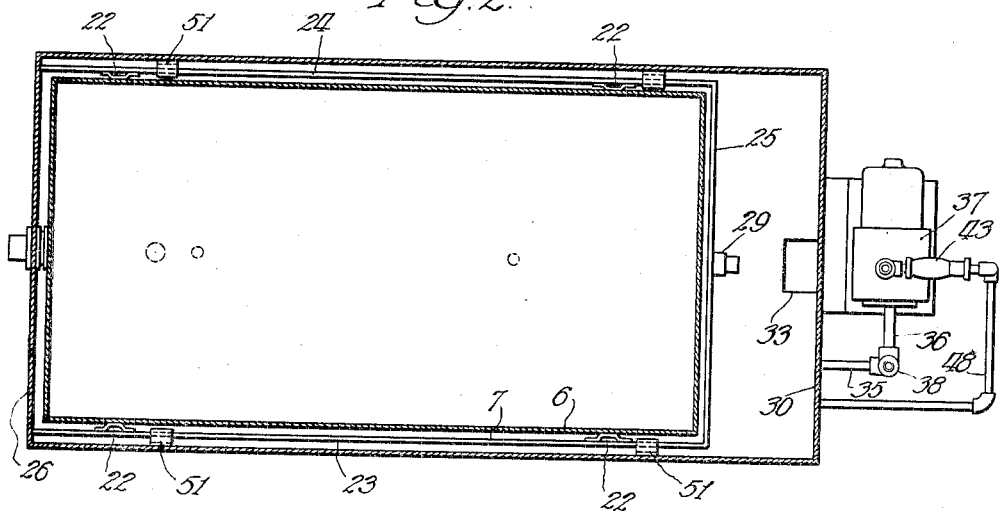
Fig. 2 is a plan view of the cheese vat on a reduced scale.

The water circulating and heating system for supplying hot water to heat the contents of the inner vessel 6 is shown best in Figs. 1 and 2. The reservoir 8 has an outlet 34 which is connected by a pipe 35 to an inlet 36 of a circulating pump 37. The connection from the pipe 35 to the inlet 36 is through a T 38 that may be connected by a hose 39 to a cold water supply pipe 40. A valve 41 is provided in the cold water supply line. It is obvious, of course, that the hose 39 may be disconnected from the T 38 to direct water into the vessels 5 and 6, if needed. The outlet of the pump 37 is shown at 42. It leads to a mixing T 43, details of which are shown in Fig. 4. A steam pipe 44 is connected through a valve 45 to a nozzle inlet 46 of the T 43. The T 43 has its outlet 47 connected to a pipe 48. The pipe 48 leads to the two inlet pipes 49 and 50 which are directed upwardly into the bottom of the outer vessel 5.

Figure 3:
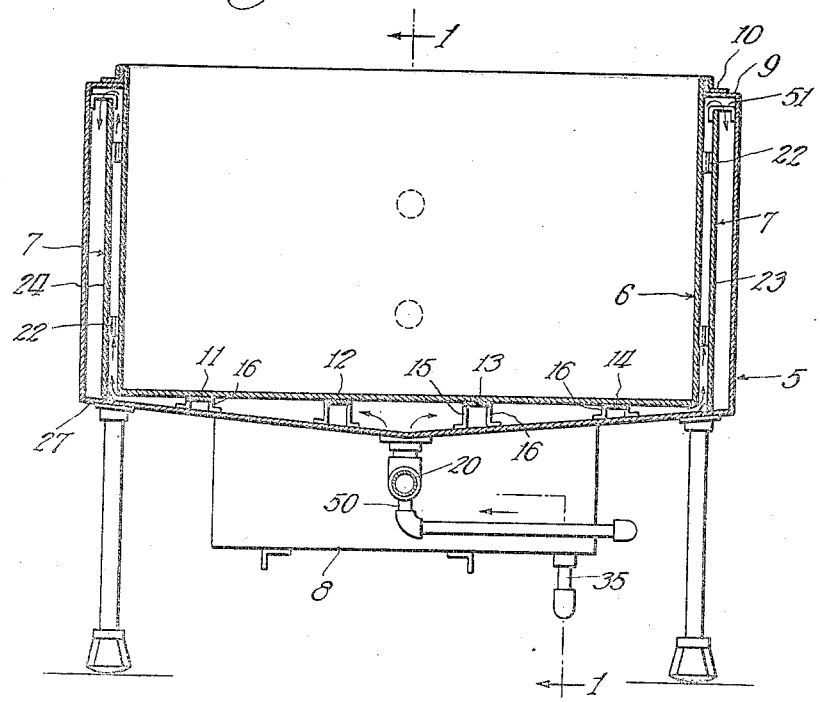
Fig. 3 is a sectional view taken substantially on the line 3—3 of Fig. 1.

The circulation of water for heating the contents of the inner vessel 6 is from the reservoir 8 through the outlet 34, pipe 35 and inlet 36 to the pump 37. From the pump 37 the water is forced through the outlet 42, the T 43, pipe 48 and inlet pipes 49 and 50 to the space between the bottom of the inner vessel 6 and the outer vessel 5. This space, it will be noted, is between the side walls 23 and 24 of the partition 7. The water forced into the outer vessel rises inside the partition walls 23, 24 and 25 and, in the usual operation, the water flows over the top of the partition walls and into the well 31 from which is is returned to the reservoir 8. The water which rises between the wall 26 of the outer vessel and the adjacent wall of the inner vessel flows over the sides of the partition walls 23 and 24 and returns to the well 31 by flowing along between the outer vessel 6 and the partition side walls 23 and 24. If it is necessary to obtain rigidity, the partition walls 23 and 24 may be connected at their top edges to the adjacent walls of the outer vessel by straps such as are indicated at 51 on Figs. 2 and 3. These straps are preferably welded in place.

The temperature control is maintained in this apparatus by directing more or less steam from the supply pipe 44 through the nozzle 46 into the water which is being pumped through the T 43. While the steam thus injected is an aid to the pump in circulating the water, the water circulation is not dependent upon the steam injection, and therefore only the amount of steam necessary to bring the water to the temperature desired need be injected. Manual operation of the valve 45 enables the cheese maker to control the temperature of the circulating water and raise the temperature of the cheese in the vessel 6 uniformly and at the desired rate. For example, in certain representative operations, the following rates of heating have been carried out: Starting with the cheese in the inner vessel 6 at a temperature of 90° F., the water to be circulated was brought up to a temperature of 105° and kept at this temperature for a period of 10 minutes. The water temperature was then gradually increased 5° every 10 minutes for 40 minutes. During this period the temperature of the cheese was raised first to 92° at the end of the first 10 minutes, 95° at the end of the second 10 minutes, 98° at the end of the third 10 minutes, and 101° at the end of the fourth 10 minutes. The hot water was then increased more rapidly in temperature, raising it 5° every 5 minutes until the temperature of the water was brought up to 155°. It was found that the cheese followed the temperature rise in the water at a uniform rate and reached a temperature of 116° by the time the water arrived at 155°. A second operation was made on a different day to check the results. This time the temperature of the water was increased more slowly, being raised approximately 5° every 15 minutes for the first hour. Starting with the water at 100° and the cheese at 90° F., the water at the end of the first hour was at 120°, while the cheese had been raised to a temperature of 100°. During the second hour the temperature of the water was increased more rapidly, being raised 10° every 15 minutes, the result being that the cheese in 45 minutes reached a temperature of 114° and with the water held at the same temperature for the last half of the hour, namely, at 140°, then reached a temperature of about 118° at the end of the hour.

Owing to the fact that the heated water rises on all sides of the inner vessel 6, the heating is uniform around the inner vessel and most of the heat is supplied through the bottom of the inner vessel. This is a desirable characteristic in uniformly raising the temperature of the cheese.

The straight, vertical sides, the flat bottom which is inclined endwise of the vat, and one vertical end of the inner vessel 6 combine to increase the yield, particularly in the handling of cottage cheese. In making cottage cheese the curd, after it is formed, is cut while in the vat by a vertical cutter. If the sides and bottom are sloping transversely, as in the ordinary cheese vat, much greater loss in fine, irregularly cut particles result. The form shown herein enables the operator to use a cutter of the right width for the distance between sides and cut clean to the flat bottom of the vat. The vat drains easily and is just as convenient otherwise as the sloping type.

Having thus described my invention, what I claim as new and desire to secure by Letters Patent is:

1. Apparatus for cheese making comprising an outer vessel, an inner vessel spaced from the outer vessel along the sides, ends and bottom, said inner vessel having an outlet, a discharge conduit extending from the outlet through the wall of the outer vessel, a partition between the two vessels and spaced from their corresponding side walls and end walls, a reservoir suspended from said outer vessel and having a capacity in excess of the space between the inner vessel and the partition, means for forcing water from the reservoir to the space inside the partition and a return passage leading from the space outside the partition to the reservoir.

2. Apparatus for cheese making comprising an outer vessel, an inner vessel spaced from the outer vessel along the sides, ends and bottom, said inner vessel having an outlet, a discharge conduit extending from the outlet through the wall of the outer vessel, a partition between the two vessels and spaced from their corresponding side walls and end walls, a reservoir suspended from said outer vessel and having a capacity in excess of the space between the inner vessel and the partition, means for forcing water from the reservoir to the space inside the partition and a return passage leading from the space outside the partition to the reservoir, said inner vessel having its side walls parallel.

3. Apparatus for cheese making comprising an outer vessel, an inner vessel spaced from the outer vessel along the sides, ends and bottom, said inner vessel having an outlet, a discharge conduit extending from the outlet through the wall of the outer vessel, a partition between the two vessels and spaced from their corresponding side walls and end walls, a reservoir suspended from said outer vessel and having a capacity in excess of the space between the inner vessel and the partition, means for forcing water from the reservoir to the space inside the partition and a return passage leading from the space outside the partition to the reservoir, said partition comprising two side walls and one end wall conecting the two side walls, said walls being joined to the bottom wall of the outer vessel and the two side walls being joined to one end wall of the outer vessel.

4. Apparatus for cheese making comprising an outer vessel, an inner vessel spaced from the outer vessel along the sides, ends and bottom, said inner vessel having an outlet, a discharge conduit extending from the outlet through the wall of the outer vessel, a partition between the two vessels and spaced from their corresponding side walls and end walls, a reservoir suspended from said outer vessel and having a capacity in excess of the space between the inner vessel and the partition, means for forcing water from the reservoir to the space inside the partition and a return passage leading from the space outside the partition to the reservoir, said inner vessel having its side walls parallel and bottom at 90° angle to parallel sides.

5. Apparatus for cheese making comprising an outer vessel, an inner vessel spaced from the outer vessel along the sides, ends and bottom, said inner vessel having an outlet, a discharge conduit extending from the outlet through the wall of the outer vessel, a partition between the two vessels and spaced from their corresponding side walls and end walls, a reservoir suspended from said outer vessel and having a capacity in excess of the space between the inner vessel and the partition, means for forcing water from the reservoir to the space inside the partition and a return passage leading from the space outside the partition to the reservoir, said partition comprising two side walls and one end wall connecting the two side walls, said walls being joined to the bottom wall of the outer vessel and the two side walls being joined to one end wall of the outer vessel, the partition end wall having vertically spaced overflow openings with closures for discharging the heating liquid to the reservoir.

6. Apparatus for cheese making comprising an outer vessel, an inner vessel spaced from the outer vessel along the sides, ends and bottoms, said inner vessel having an outlet, a discharge conduit extending from the outlet through the outer vessel, a partition between the two vessels and spaced from their corresponding side walls and end walls, a reservoir having a capacity in excess of the space between the inner vessel and the partition, means for forcing water from the reservoir to the space inside the partition, and a return passage leading from the space outside the partition to the reservoir.

7. Apparatus for cheese making comprising an outer vessel, an inner vessel spaced from the outer vessel along the sides, ends and bottom, said inner vessel having an outlet, a discharge conduit extending from the outlet through the outer vessel, a partition between the two vessels and spaced from their corresponding side walls and end walls, a reservoir having a capacity in excess of the space between the inner vessel and the partition, means for forcing water from the reservoir to the space inside the partition, means to supply heat to the water as it travels from the reservoir to said space, and a return passage leading from the space outside the partition to the reservoir.

CLARK DERLETH.